United States Patent [19]
Schuman

[11] 3,722,496
[45] Mar. 27, 1973

[54] CONCRETE CUTTING HAND SAW

[76] Inventor: Albert Schuman, 3424 Marina Drive, Santa Barbara, Calif. 93109

[22] Filed: Jan. 28, 1971

[21] Appl. No.: 110,502

[52] U.S. Cl. .............................. 125/13 R, 143/43 A
[51] Int. Cl. ........................................... B28d 1/04
[58] Field of Search ....... 143/43 R, 43 A, 43 F, 43 C; 125/13

[56] References Cited

UNITED STATES PATENTS

| | | | |
|---|---|---|---|
| 1,854,510 | 4/1932 | Haas | 143/43 F |
| 1,830,579 | 11/1931 | Wappat | 143/43 F |
| 1,806,528 | 5/1931 | Fegley | 143/43 F |
| 1,803,068 | 4/1931 | McKeage | 143/43 C |
| 2,014,229 | 9/1935 | Emmons | 125/13 R |
| 2,502,656 | 4/1950 | Koett | 143/43 X |

FOREIGN PATENTS OR APPLICATIONS

| | | | |
|---|---|---|---|
| 593,566 | 5/1959 | Italy | 125/13 R |

*Primary Examiner*—Harold D. Whitehead
*Attorney*—Christie, Parker & Hale

[57] ABSTRACT

A concrete cutting hand saw has a base plate for engaging a concrete surface to be cut. The saw is driven by a motor having a housing and a rotatable saw blade supporting spindle. A shroud member is adapted to receive a circular saw blade therein and to mount the motor housing thereto with the spindle extending into the shroud member. The shroud member is arranged to enclose opposite sides of the saw blade engaged with the spindle over a substantial portion of the area of the blade. Means connect the shroud member to the base plate for hinging motion about an axis parallel to the spindle axis and spaced therefrom. An elongate shroud guide, having an elongate arcuate slot curved concentric to the hinge axis, is fixed to the base plate. Selectively operable means for fixing the shroud member at a desired angular position relative to the base plate include a connecting member removably positioned through the arcuate slot and matable with a socket defined in the shroud member. The connecting member is fully releasable from the socket and the slot so that the shroud member is hingeable relative to the base member through an arc greater than that subtended by the slot. In this manner the saw blade may be easily inserted into the shroud member into coaxial alignment with the spindle.

2 Claims, 5 Drawing Figures

CONCRETE CUTTING HAND SAW

BACKGROUND OF THE INVENTION

1. Field of the Invention

This invention relates to the cutting of concrete. More specifically, the invention relates to concrete cutting hand saws and to a method for installing a saw blade in same.

2. Description of the Prior Art

Recommended procedure in cutting concrete with a hand saw is to start with a small blade and then go to a larger blade. A cut of desired depth preferably is made in multiple passes with progressively larger blades, thereby making frequent blade changing a necessary requirement. Since concrete cutting blades generally have a diamond studded peripheral edge, it is also a requirement that great care be taken in blade changing so as not to damage the diamond cutting surface.

Concrete cutting hand saws generally can be classified into two main groups: (1) converted wood cutting hand saws and (2) hand saws designed specifically for cutting concrete. The former group is not the most efficient for a number of reasons. For one, the axis of saw blade rotation is not readily adjustable relative to the saw base plate. This results in imperfect control over the depth of the cut during each pass and in improper tracking of the saw during each pass. To compound these problems, blade changing is a time consuming and often damaging process. This is true since, in converting a wood cutting hand saw to a concrete cutting one, a water duct must be added along the base plate to discharge water onto the saw blade so that centrifugal force sprays the water into the cut. The presence of the water ducting on the base plate makes it most difficult to change the blade.

In an effort to remedy the difficulties inherent in converted wood saws, hand saws designed specifically to cut concrete were introduced. These saws generally include a saw shroud pivotally mounted to a base plate by a loosenable bolt to allow the angular position of the shroud relative to the base plate to be varied for control over the cut depth. The saw shroud covers a substantial area of a saw blade, which is necessary to protect the cutter from splatter of the water spray which is used to lubricate the surface between the saw periphery and the concrete; in these saws, the water spray apparatus is located entirely within the shroud. The saw blade is rotatably mounted on a spindle driven by a motor mounted to the shroud. An elongate shroud guide is fixed to the base plate and defines an arcuate slot curved concentric to the pivot axis of the saw shroud relative to the base plate.

A bolt is used to selectively fix the angular position of the shroud member relative to the base plate. Specifically, the head of the bolt is permanently disposed within the saw shroud with its shank permanently passed through the saw shroud and the elongate slot in the shroud guide. The other end of the bolt is fastened by a wing nut or the like. Although the saw shroud is selectively pivotable relative to the base plate by loosening the nut, thereby permitting control over the cut depth, the shroud is confined to pivot through an arc less than or equal to that subtended by the elongate slot. This complicates blade changing since the blade has to be first inserted through a longitudinal aperture in the base plate, then into the shroud laterally of the spindle axis, and then positioned over the spindle. The blade cannot be loaded coaxially of the spindle because it must be first passed through the base plate, the saw shroud being specifically designed to cover a substantial portion of the blade for the reasons above described. The result is that the process of changing a saw blade is a time consuming process, often leading to damage of the saw blade and to injury of the operator.

SUMMARY OF THE INVENTION

The disadvantages inherent in the concrete cutting hand saws described above have been essentially eliminated in the saw of the present invention, which is among those classified in group (2) above. Specifically, blade changing has been made extremely easy notwithstanding the fact that the shroud covers a substantial portion of the blade. One reason is that a connecting member, such as a bolt, used to fix the angular position of the shroud relative the base plate, by clamping the shroud to the shroud guide, has been reversed end for end so that the bolt head no longer is fixed within the shroud. Now the bolt head is outside the shroud with its shank passing through the shroud and shroud guide arcuate slot. By removing the bolt completely clear of the shroud guide, the shroud may be pivoted through an arc much greater than that subtended by the elongate slot. In this manner, the blade to be installed need not first be passed through a slot in the base plate and then into the shroud. Now, it can be passed directly into the shroud laterally of the motor driven spindle and then coaxially onto the spindle.

Generally speaking, therefore, the invention comprises a concrete cutting hand saw having a base plate for engaging a concrete surface to be cut. The saw is driven by a motor having a saw blade supporting spindle coupled thereto. A shroud member is adapted to receive a circular saw blade therein and to mount the motor thereto with the spindle extending into the shroud member. The shroud member is arranged to enclose opposite sides of the saw blade engaged with the spindle over a substantial portion of the area of the blade. Means connect the shroud member to the base plate for hinging relative motion therebetween about an axis parallel to the spindle axis and spaced therefrom. An elongate shroud guide, having an elongate arcuate slot curved concentric to the hinge axis, is fixed to the base plate. Selectively operable means, for fixing the shroud member at a desired angular position relative to the base plate, includes a connecting member removably positioned through the elongate slot and matable with a socket defined in the shroud member. The connecting member is fully releasable from the socket and the slot so that the shroud member is hingeable relative to the base member through an arc greater than that subtended by the slot for insertion of the saw blade into the shroud member into coaxial alignment with the spindle.

Also disclosed is a method for installing a saw blade onto a saw of the type above described. Basically, the method includes the steps of loosening the connecting member so that it is released from within the socket and the slot; pivoting the shroud member through an arc substantially greater than that subtended by the elongate slot; moving the saw blade into the shroud member laterally of the spindle from above the base plate; moving the saw blade into coaxial alignment with the spindle and then laterally toward and onto the spindle; and securing the blade on the spindle so that the former rotates with the latter.

BRIEF DESCRIPTION OF THE DRAWING

These and other aspects and advantages of the present invention are more clearly described with reference to the accompanying drawing in which.

DESCRIPTION OF THE PREFERRED EMBODIMENT

Figure 3:
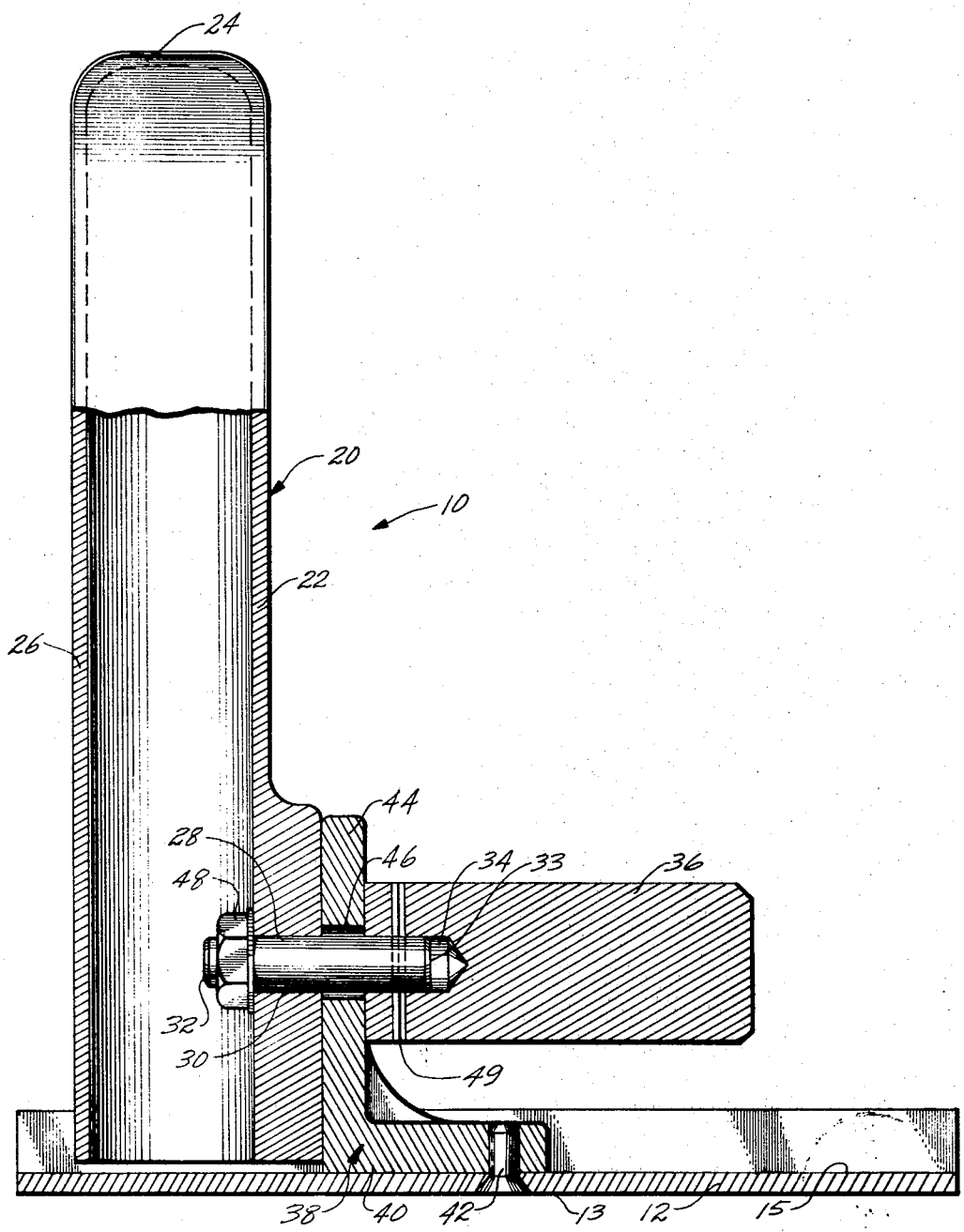
FIG. 3 is a cross-sectional view of the saw taken along lines 3—3 of FIG. 1.
Figure 4:
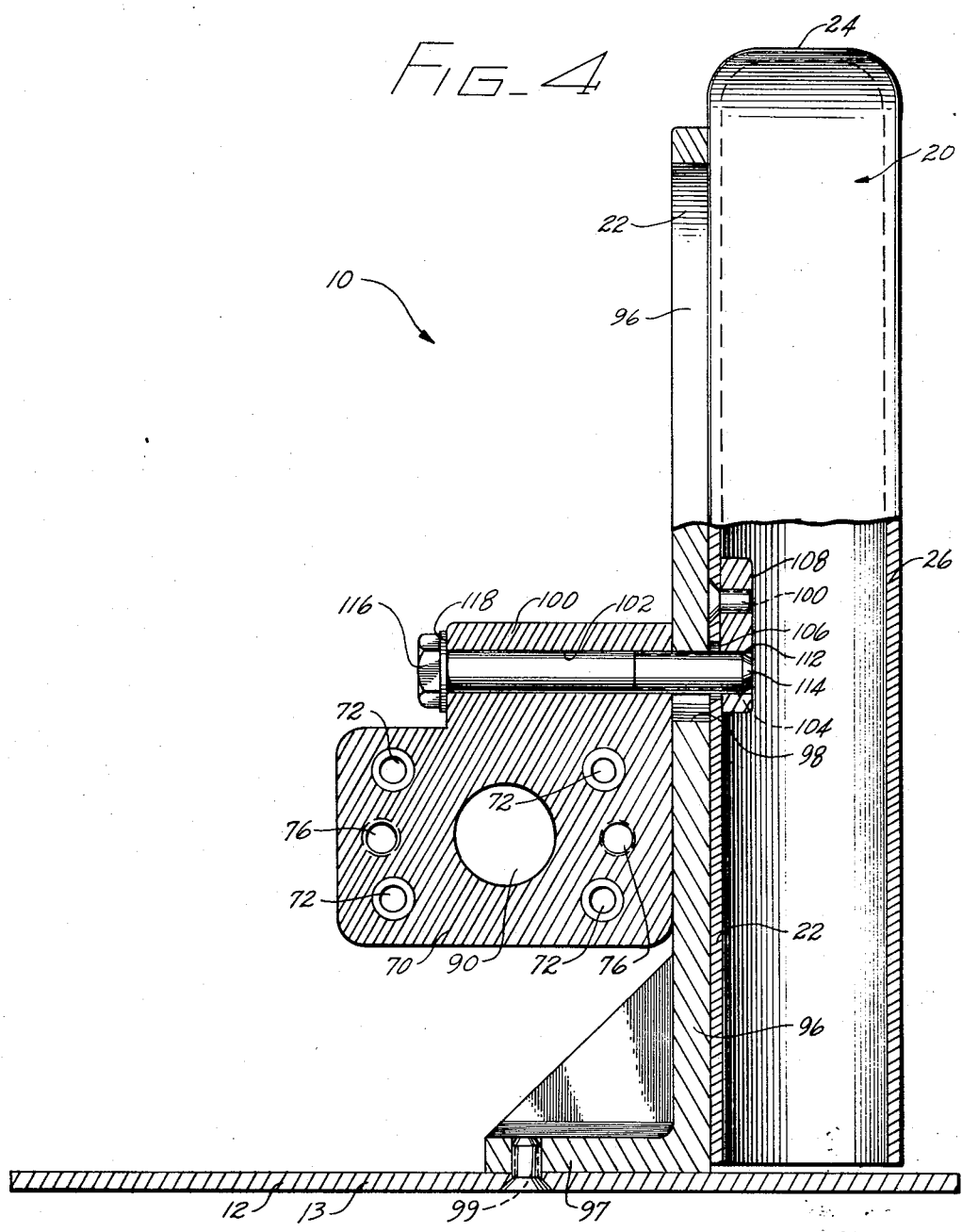
FIG. 4 is a cross-sectional view of the saw taken along lines 4—4 of FIG. 1.
Figure 5:
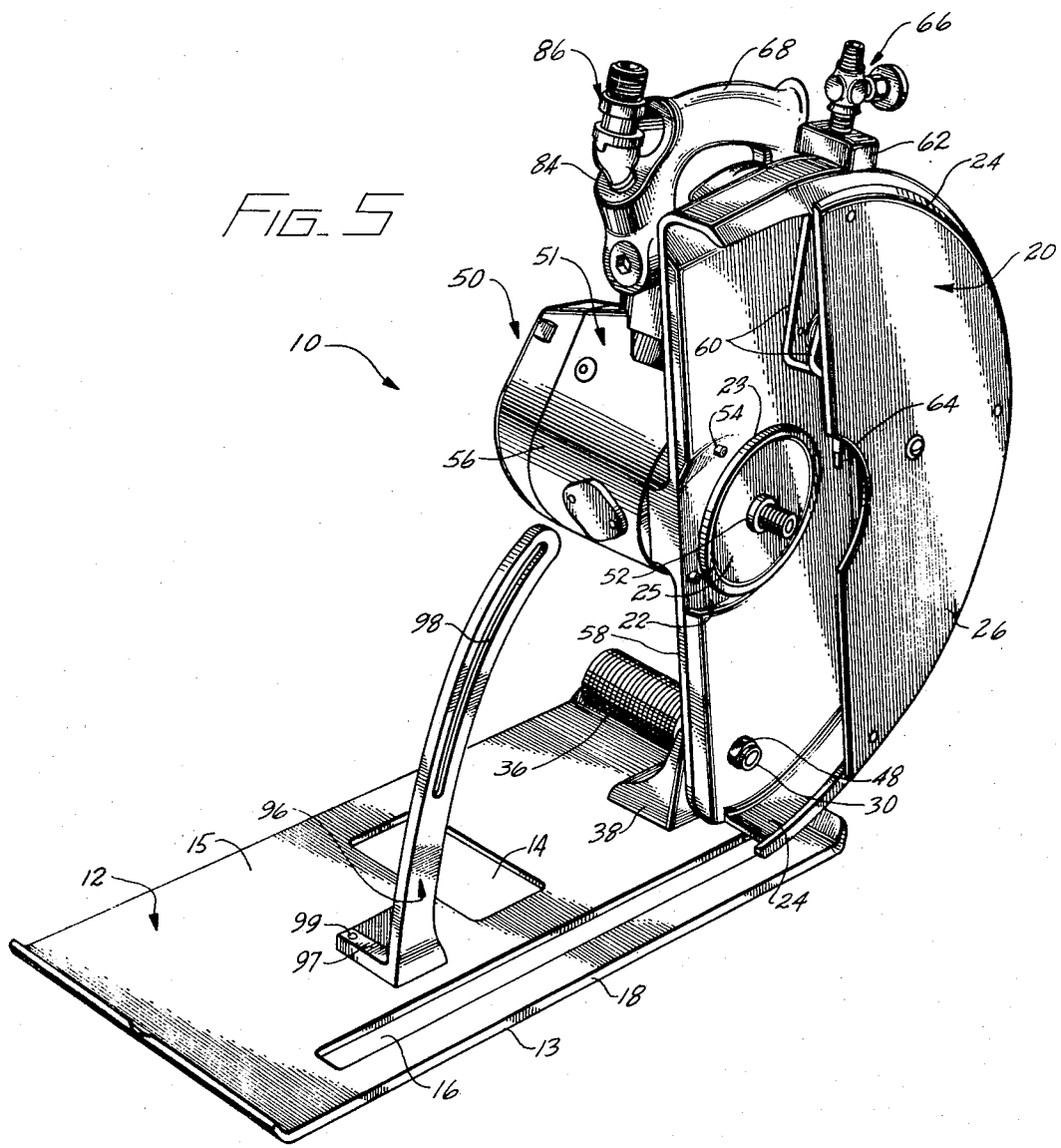
FIG. 5 is a perspective view of the saw.

A presently preferred concrete cutting hand saw 10, according to the present invention, is shown in FIGS. 1–5. Basically, saw 10 includes an essentially planar base plate 12 having a bottom surface 13 for engaging a concrete surface to be cut. The front and rear ends of plate 12 are turned up so as to facilitate movement of the plate along a surface. As best shown in FIG. 5, plate 12 includes a rectangular-shaped aperture 14 which is designed to accommodate the lower portion of a saw disc drive motor. As will be described in greater detail below, by accommodating the lower portion of the saw motor, aperture 14 allows the axes of rotation of a saw blade (not shown) to be lowered closely adjacent the base plate so as to maximize the permissible cut depths by the saw and also to place the center of gravity of the saw 10 as close as possible to the base plate. Base plate 12 further includes a longitudinal aperture 16 located adjacent and parallel to a rear edge 18 of the plate. Aperture 16 is designed to accommodate a saw blade therethrough and to stabilize it from movement in directions parallel with the axis of rotation of the blade.

A saw blade shroud member 20 of essentially semi-circular configuration is pivotally mounted to an upper surface 15 of base plate 12. More specifically, shroud 20 includes a semi-circular front plate 22 having a U-shaped peripheral flange 24 to which is bolted an essentially semi-circularly configured rear plate 26. Shroud 20 is designed to enclose opposite sides of a saw blade (not shown) over as much of the area of the blade (about 40%) as possible. The front plate of shroud 20 includes a circular aperture 23 into which is fitted a disc 25 having an aperture 27 adapted to receive and journal a saw disc spindle 52.

Figure 1:
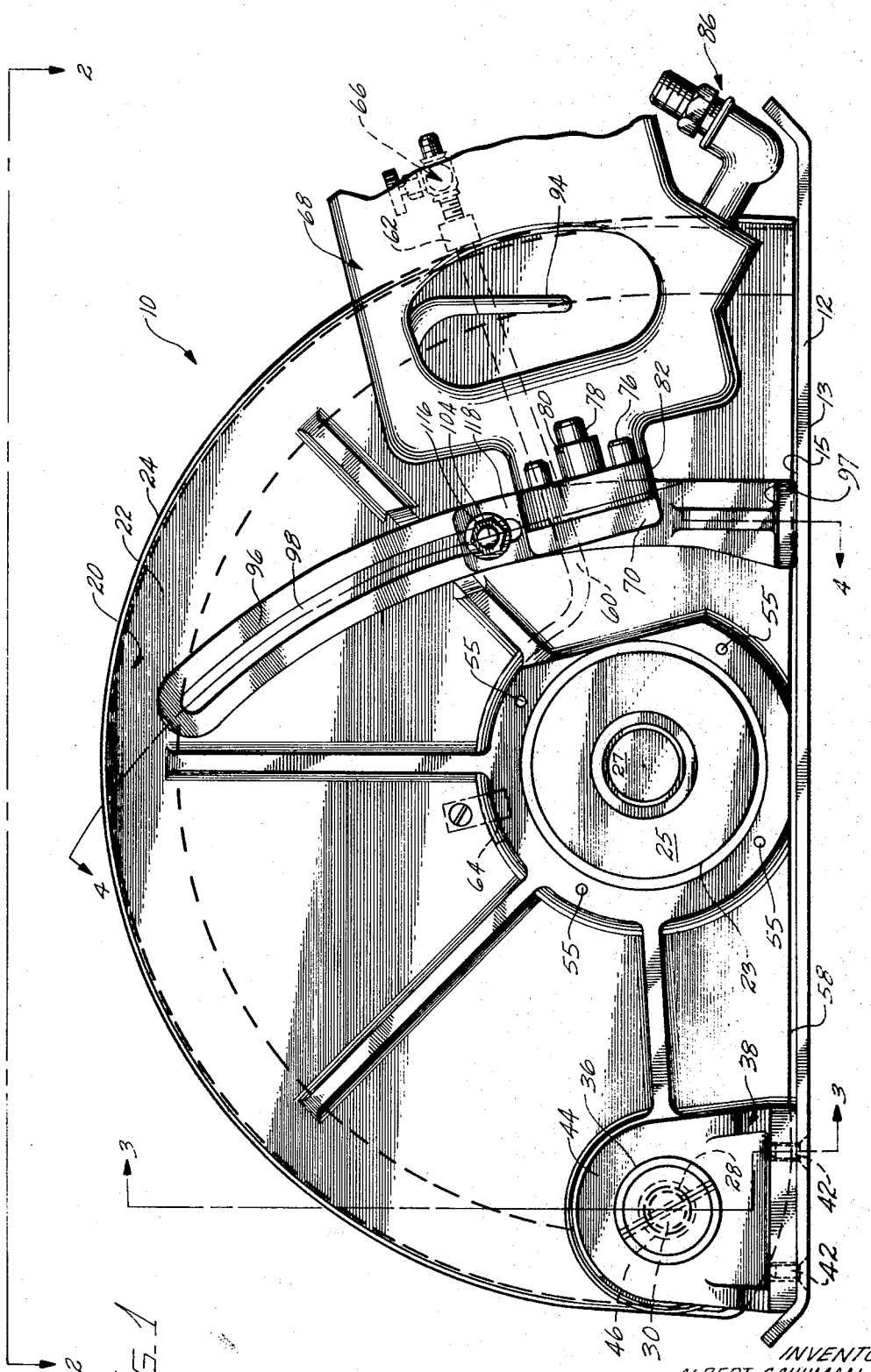
FIG. 1 is a front elevation view of a concrete cutting hand saw according to the present invention with the motor removed for purposes of illustration.

As best shown in FIGS. 1 and 3, the lower left extent of front plate 22 includes a circular aperture 28 designed to accommodate the shank of a pivot pin 30 a threaded end 32 of which is located within shroud 20. The other end 33 of pin 30 is engaged within a recess 34 defined in a cylindrical handle 36. The shank of pin 30 is also disposed through an L-shaped mounting bracket 38 having a horizontal leg 40 secured to base plate 12 by a pair of screws 42. A vertical leg 44 of bracket 38 is engaged between shroud front plate 22 and a washer 37 disposed around the pivot pin shank and handle 36; bracket leg 44 includes a circular aperture 46 through which the shank of pin 30 passes. A nut 48 is threaded on pin end 32 within shroud 20 to tighten the shroud and handle 36 against opposite sides of bracket 38.

Shroud 20 may thus be pivoted about a hinge axis defined by the longitudinal axes of pin 30. In this regard, it is noted that shroud 20 is not prevented from pivoting about pin 30 when nut 48 is tightened. Rather, handle 36 is of the type which permits pin end 33 to be turned within recess 34 at all times independently of the state of nut 48, end 33 of pin 30 is maintained in recess 34 by a split roll pin 49 which functions in a manner akin to a cotter pin. As will be described below in greater detail, however, the invention does include means for selectively fixing the pivotal position of shroud 20 relative to base plate 12 so that a cut of a selected depth may be attained.

Figure 2:
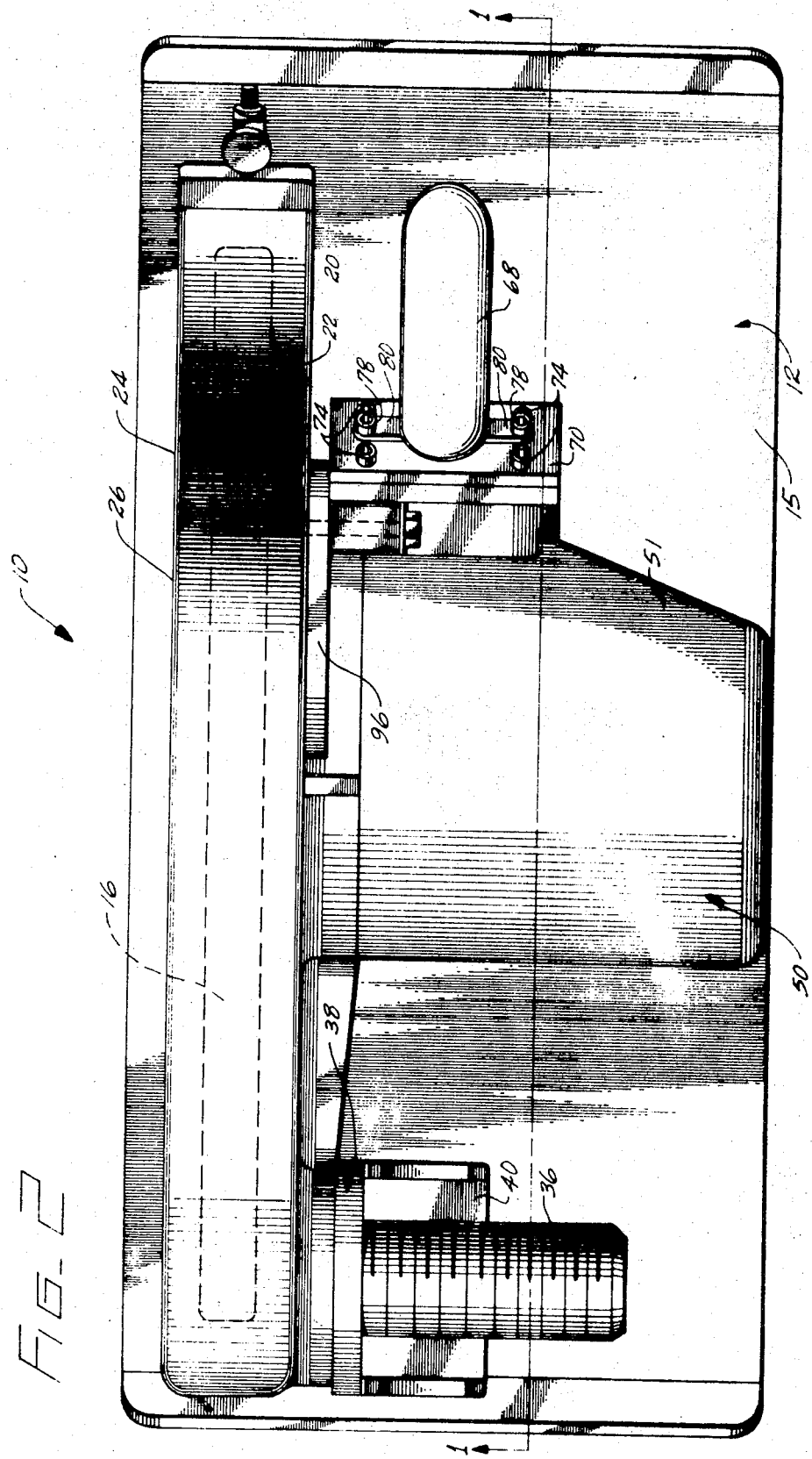
FIG. 2 is a plan view of the saw taken along lines 2—2 of FIG. 1.

With reference to FIG. 2, it is noted that bracket 38 is secured to base plate 12 in a position such that the interior of shroud 20 is exposed to and aligned with base plate longitudinal aperture 16. In this manner, a saw blade mounted with shroud 20 may be positioned through aperture 16 for engagement with a surface to be cut.

A saw blade drive motor 50 is shown in FIGS. 2 and 5. Motor 50 is a conventional air motor which drives a saw blade supporting spindle 52 coupled coaxially to the motor shaft, as is conventional. Motor 50 has a housing 51 containing a rear face (not shown). The motor housing rear face is bolted to front plate 22 at spaced points about aperture 23 (FIG. 1) by bolts 54 threaded into holes 55 tapped through the shroud adjacent aperture 23. The motor is bolted in a manner such that spindle 52 is disposed through aperture 27 in disc 25 (see also FIG. 1) to have its threaded end located in the interior of shroud 20. Motor housing 51 has a lower surface 56 which is adapted to be accommodated in base plate aperture 14. This permits the motor to be mounted to shroud 20 with its drive spindle very closely adjacent a lower edge 58 of the shroud. In this manner, when shroud 20 is in a closed position, i.e., with shroud edge 58 parallel to base plate 12 (FIG. 1), the drive spindle is closely adjacent the base plate thereby maximizing the possible cut depth by a saw blade (not shown) carried on spindle 52.

As stated previously, it is desired that water be injected into a cut being made by a concrete saw to lubricate the saw and to wet down the masonry duct generated by the cutting action of the saw. In this regard, a water jet assembly is carried by shroud 20. The assembly includes a pair of conduits 60 (FIGS. 1 and 5) for transmitting water from their inlet ends disposed within a manifold block 62 mounted to the exterior of shroud flange 24 to their outlet ends 64 disposed within shroud 20. The conduits are spaced from each other along opposite sides of the interior of the shroud a distance sufficient so that they are situated on opposite sides of a saw blade carried by drive spindle 52. As a saw blade is rotated, water is emitted from the outlet ends of conduits 60 onto the opposite sides of the saw blade adjacent its axis of rotation, the rotating saw blade carrying the water into a cut being made by the saw. In this manner, the cut is sufficiently lubricated.

Water is supplied to conduits 60 through manifold 62 by means of a valve 66 coupled to the manifold inlet. The valve is adapted to be coupled to a source of water (not shown) and is operated manually by the operator.

A hand grip 68 is secured to motor housing 51 by being bolted to a mounting block 70, which is in turn bolted to motor housing 51. Specifically, and as more clearly shown in FIGS. 1, 2 and 5, block 70 includes a set of four circular apertures 72 positioned adjacent the corners of the block and designed to receive a corresponding set of bolts 74. Bolts 74 are further adapted to be mated within a corresponding set of sockets (not shown) defined in a side of motor housing 51. In this manner, block 70 is secured to motor housing 51 and thus to shroud 20 for pivotable movement therewith about hinge 36. Mounting block 70 further includes a pair of apertures 76 (see FIG. 4) positioned adjacent opposite sides of the block and designed to receive corresponding bolts 78. Bolts 78 are further positioned through another pair of apertures defined through a respective pair of flanges 80 (FIG. 2) extending laterally from opposing sides of a front end 82 of hand grip 68. In this manner, hand grip 68 is securely fastened to mounting block 70 and thus to shroud 20.

Hand grip 68 is not only designed to afford a cutter means by which to guide the saw along a desired cutting path, but additionally provides a means for selectively operating air motor 50. More specifically, hand grip 68 includes an air inlet opening 84 (FIG. 5) adapted to receive a fitting 86 by which a compressed air hose may be connected to the saw. A channel (not shown) is formed within hand grip 68 for supplying compressed air through an air valve (not shown, since this is conventional) in the hand grip, as is common, to motor 50 via a passage 90 in mounting block 70 (see FIG. 4). Hand grip 68 further includes an air control trigger lever 94 coupled to the air valve in the hand grip in the conventional manner.

A shroud guide 96, in the shape of an arcuate arm, has a laterally extending leg 97 fixed to base plate 12 by a pair of screws 99 rearwardly of aperture 14 and adjacent aperture 16 (see FIG. 5). Guide 96 is positioned closely adjacent shroud 20 when the latter is in a closed, or down, position as shown in FIG. 1. An elongate arcuate slot 98 is defined in guide 96 and is curved concentric to the hinge axis of shroud 20 at hinge pin 30. In other words, a point on shroud member 20 aligned with slot 98 when the shroud is in a down position will be so aligned all the way along the slot as shroud 20 is pivoted upwardly about handle 36.

With the above in mind, and as best shown in FIG. 4, mounting block 70 has an upper flange 100 having an aperture 102 defined therethrough for receipt of the shank of a connecting member, such as bolt 104, therein. Aperture 102 is aligned with arcuate slot 98 and with an aperture 106 defined through shroud front plate 22. A socket member 108 is secured to the back surface of shroud front plate 22 by means of screws 110. Socket member 108 has a tapped hole 112 defined therein to receive the threaded end 114 of bolt 104. The head 116 of bolt 104 is disposed outside shroud 20 and adjacent the front face 118 of flange 100. Tightening of bolt 104, when the bolt passes through shroud guide slot 98 as shown in FIG. 4, securely clamps shroud 20 to shroud guide 96 and also clamps block 70 to the shroud guide, thereby fixing the position of the shroud relative to base plate 12.

It is clear that any one of a range of angular positions of shroud 20 relative to base plate 12 may be set and used to complete a cut of a desired depth. More specifically, by raising or lowering shroud 20, the shank of bolt 104 rides through slot 98 thereby guiding the hinging movement of the shroud member about pivot pin 30. The limits of travel of the shroud relative to the base plate, during most cutting operations, are thereby defined at either end of slot 98 when the shank of bolt 104 contacts them. At any position of bolt 104 through slot 98 between such limits, the shroud may be clamped thereby presetting a desired cut depth by a saw carried within shroud 20.

An important feature of the present invention is the ability to move shroud 20 upwardly from its down position (FIG. 1) through an arc much greater than that subtended by slot 98 (see FIG. 5) so as to facilitate blade changing and installation. More specifically, by removing bolt 104 from socket member 108 and moving the bolt out of slot 98, shroud 20 may be hinged into the position shown in FIG. 5. This makes blade changing extremely efficient, easy and fast since a blade can be installed within shroud member in a three step procedure as follows: (1) moving the blade into the shroud member laterally of the axis of rotation of spindle 52; (2) moving the blade laterally toward front plate 22 into coaxial alignment and engagement with spindle 52 from above base plate 12; and (3) securing the blade on the spindle by the conventional clamp disc so that the saw disc rotates with the latter.

The above procedure differs from that possible in concrete cutting hand saws of the past which required that the saw blade first be carefully passed through longitudinal aperture 16 in base plate 12 since the shroud member could be pivoted upwardly only until a bolt, fixed through a shroud guide elongate slot engaged the upper limit thereof. More specifically, the head of the bolt used in the past was within the shroud member with its thread end extending outwardly from the elongate slot and being fastened by a wing nut or the like. By loosening the nut, the shroud could be hinged relative to the base plate, but only within the limits defined by the ends of the slot.

Another important feature of the present invention is the ability to position the saw blade supporting spindle very closely adjacent the base plate when the shroud member is in its down or closed position. This enables a cut of maximum possible depth to be made by a saw employed. More specifically, aperture 14 in base plate 12 permits lower surface 56 of motor housing 51 to be accommodated therewithin so that drive spindle 52 is lowered closer to base plate 12. A cut depth could be further maximized by moving the saw downwardly within the shroud out of coaxial relation to the motor and driving the saw through a gear box interposed between the saw blade supporting spindle and the motor drive shaft. In this alternative situation, the minimum distance possible between the saw blade supporting spindle and the bottom surface of the base plate is determined by the diameter of the gear box housing. Such alternative is within the contemplation of the present invention.

What has been described, therefore, is a concrete cutting hand saw which greatly aids in the efficient changing and loading of blades, it being noted that frequent blade changing is a necessary requirement in properly cutting concrete. What has also been described is a method for loading a saw blade onto a saw of the present invention. Although the invention has been described with reference to the specific embodiment disclosed, it will be appreciated that certain modifications may be made without departing from the spirit of the invention as defined in the following claims. Such modifications are considered part of the present invention.

What is claimed is:

1. A motor driven hand saw for cutting concrete and the like comprising:
   a. a base plate having a bottom surface for engaging a concrete surface to be cut and defining therethrough an elongate aperture through which a cutting disc extends during use of the saw;
   b. a motor having a housing and a rotatable supporting spindle for a cutting disc;
   c. a shroud member for receiving a circular cutting disc therein and mounting the motor housing thereto with said spindle extending into the shroud member, the shroud member being arranged to enclose opposite sides of a cutting disc engaged with the spindle over a substantial portion of the area of the disc;
   d. means connecting the shroud member to the base plate for hinging relative motion therebetween in the plane of the elongate extent of the base plate aperture only about an axis parallel to the spindle axis and spaced therefrom;
   e. means for guiding said hinging motion including an elongate shroud guide fixed to the base plate to extend closely adjacent an exterior surface of the shroud member and defining an elongate arcuate slot therethrough curved concentric to said hinge axis; and
   f. selectively operable means for securing the shroud member at a desired angular position relative to the base plate including a threaded socket defined in the shroud member, an elongate bolt matable with the socket through the shroud guide elongate slot, and an element carried by the shroud member closely adjacent the side of the shroud guide opposite from the shroud member and defining an elongate hole aligned with the socket for receiving the bolt and for guiding the bolt into the socket, the element being arranged so that the bolt is engageable between the element and the socket through the slot in the shroud guide for clamping the shroud guide between the shroud member and the element thereby to secure the shroud member at the desired angular position relative to the base, the bolt being fully releasable from the socket and the arcuate slot whereby the shroud member is hingeable relative to the base member through an arc greater than that subtended by the arcuate slot for insertion of a cutting disc into the shroud member into coaxial alignment with the spindle other than through the base plate aperture.

2. The concrete cutting hand saw of claim 1 including water duct means carried by the shroud member for discharging water supplied thereto onto a cutting disc engaged with the spindle.

* * * * *